United States Patent [19]
Andre

[11] Patent Number: 6,009,912
[45] Date of Patent: *Jan. 4, 2000

[54] STEEL PIPE WITH INTEGRALLY FORMED LINER AND METHOD OF FABRICATING THE SAME

[76] Inventor: James R. Andre, P.O. Box 2450, Newport Beach, Calif. 92658-8972

[*] Notice: This patent is subject to a terminal disclaimer.

[21] Appl. No.: 08/866,812

[22] Filed: May 30, 1997

Related U.S. Application Data

[63] Continuation of application No. 08/504,774, Jul. 20, 1995, abandoned, which is a continuation-in-part of application No. 08/225,440, Apr. 8, 1994, Pat. No. 5,480,505, which is a continuation-in-part of application No. 07/736,108, Jul. 26, 1991, Pat. No. 5,316,606.

[51] Int. Cl.[7] .................................... F16L 9/147
[52] U.S. Cl. .................... 138/143; 138/122; 138/129; 138/135; 138/144; 138/150; 138/152
[58] Field of Search ...................... 138/122, 129, 138/134, 135, 137, 141, 143, 144, 145, 146, 147, 150, 152, 154

[56] References Cited

U.S. PATENT DOCUMENTS

| | | | |
|---|---|---|---|
| 3,126,306 | 3/1964 | Sherman | 156/187 |
| 3,247,692 | 4/1966 | Davis | 72/49 |
| 3,422,856 | 1/1969 | Hunter et al. | 138/143 |
| 3,721,597 | 3/1973 | Colburn | 156/309 |
| 3,868,433 | 2/1975 | Bartz et al. | 260/876 R |
| 3,877,136 | 4/1975 | Groch et al. | 29/445 |
| 4,312,902 | 1/1982 | Murase et al. | 138/145 |
| 4,472,475 | 9/1984 | Decroix | 428/215 |
| 4,575,400 | 3/1986 | Ueda et al. | 156/428 |
| 4,606,953 | 8/1986 | Suzuki et al. | 428/36 |
| 4,630,650 | 12/1986 | Davis | 138/154 |
| 4,689,174 | 8/1987 | Lupke | 156/470 |
| 4,763,830 | 8/1988 | Davis | 228/145 |
| 4,838,317 | 6/1989 | Andre et al. | 138/135 |
| 4,964,440 | 10/1990 | Andre et al. | 138/122 |
| 5,300,336 | 4/1994 | Wong et al. | 428/35.9 |
| 5,316,606 | 5/1994 | Andre | 156/201 |
| 5,356,679 | 10/1994 | Houis et al. | 428/35.9 |

FOREIGN PATENT DOCUMENTS 51526  4/1980  Japan ............................. 156/244.13

OTHER PUBLICATIONS

Modern Plastic Encyclopedia, Mid–Oct. 1990 issue, vol. 67, No. 11, pp. 70 and 821.
Adhesives Age, Feb. 1985, vol. 28, No. 2, pp. 3 and 8.

*Primary Examiner*—James F. Hook
*Attorney, Agent, or Firm*—Stetina Brunda Garred & Brucker

[57] ABSTRACT

A metal pipe and method of forming the same with an integrally formed liner for use in corrosive and abrasive environment utilizes a liner formed of a comparatively thick polymer which is thermally bonded to the metal pipe. An intermediate polymer/adhesive layer is applied to the metal pipe to facilitate thermal/chemical bonding. The intermediate layer is preferably applied to the sheet metal in a pre-treatment process prior to roll forming ribs into the sheet metal. The polyethylene liner is applied after the pipe has been formed, to provide a smooth, hydraulically efficient surface which is resistant to the corrosive action of sulfuric acid and the like encountered in sanitary applications, as well as abrasion caused by the flow of water-born debris such as dirt and gravel as is encountered in culvert applications.

16 Claims, 5 Drawing Sheets

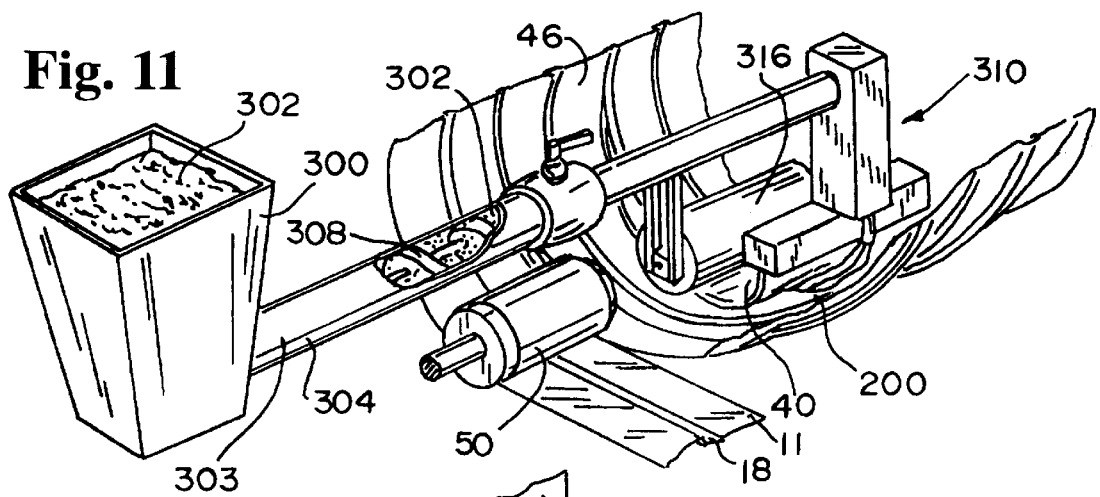
Fig. 11
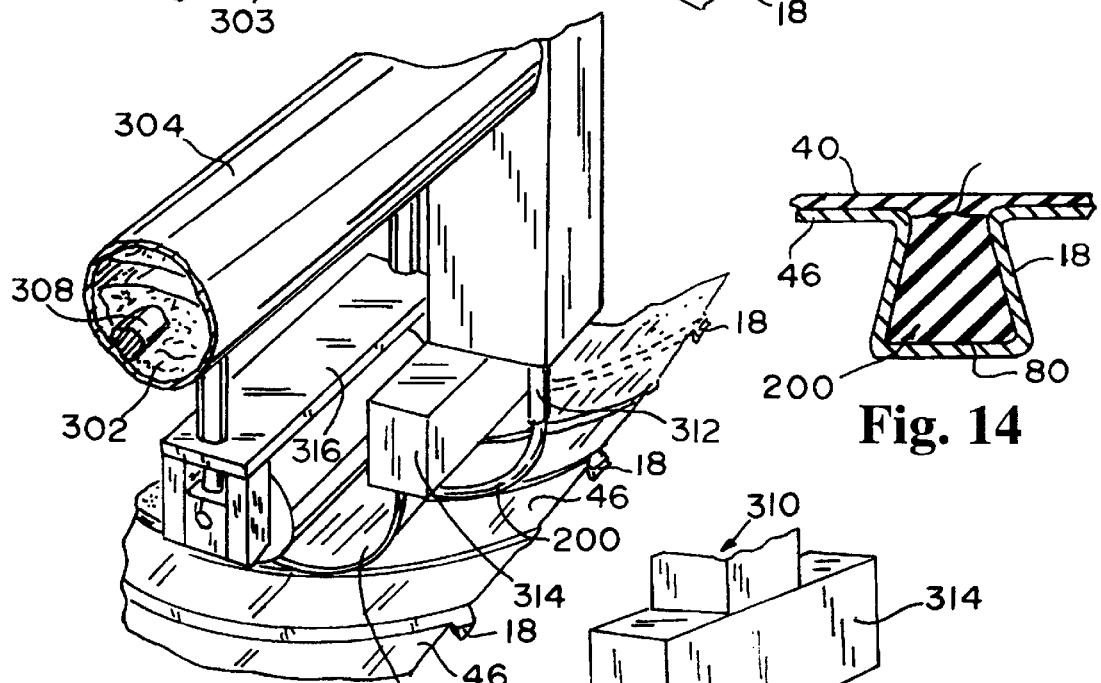
Fig. 12
Fig. 13
Fig. 14

STEEL PIPE WITH INTEGRALLY FORMED LINER AND METHOD OF FABRICATING THE SAME

The present application is a continuation of U.S. Application Ser. No. 08/504,774 entitled STEEL PIPE WITH INTEGRALLY FORMED LINER AND METHOD OF FABRICATING THE SAME filed Jul. 20, 1995, now abandoned which is a continuation-in-part of U.S. Application Ser. No. 08/225,440 entitled METHOD OF FABRICATING A STEEL PIPE WITH INTEGRALLY FORMED LINER filed Apr. 8, 1994 and now U.S. Pat. No. 5,480,505 issued Jan. 2, 1996, which is a continuation-in-part of U.S. Application Ser. No. 07/736,108 entitled METAL PIPE WITH INTEGRALLY FORMED LINER AND METHOD OF FABRICATING THE SAME filed Jul. 26, 1991 and now U.S. Pat. No. 5,316,606 issued May 31, 1994. The contents of the aforementioned pending application and issued patents are incorporated herein by reference.

FIELD OF THE INVENTION

The present invention relates generally to buried pipe for use in sewers, storm drains, pen stocks, culverts and other low head applications, and more particularly to metal pipe with an integrally formed liner for use in corrosive and abrasive environments and a method of fabricating the same.

BACKGROUND OF THE INVENTION

Metal pipe of both corrugated and spiral rib design is widely used for drainage, culverts and other similar fluid conduits. Although susceptible to abrasion, steel pipe has advantages over concrete pipe and the like due to its comparatively high strength and low weight. These characteristics render metal pipe comparatively inexpensive to manufacture, ship and handle while permitting its use in applications requiring it to support substantial soil overburden. Further, in recent years a particular spiral ribbed steel pipe has been introduced by W. E. Hall Co., of Newport Beach, Calif., the assignee of the subject application, that possesses hydraulic efficiency comparable to more costly concrete pipe as well as possesses superior structural capabilities for prolonged use in buried storm drain applications.

Since metal pipe is susceptible to corrosion and excessive abrasion, its use has heretofore been restricted primarily to culvert and storm drain applications. In sanitary applications, i.e. sewer systems, corrosion causing sulfuric acid is formed from hydrogen sulfide gas generated by waste products. Such waste products and/or acid has rendered the use of steel pipe in sanitary applications impractical since it rapidly deteriorates in the corrosive environment. As such, much heavier and more expensive concrete, lined concrete and/or vitreous clay pipe has traditionally been utilized for sanitary applications. Thus, although metal pipe is generally preferred because of its high strength and comparatively low weight and cost, metal pipe has heretofore not been widely used in sanitary applications due to its susceptibility to corrosion.

In storm drain applications, such metal pipe is particularly susceptible to extensive abrasion caused by the movement of gravel, dirt, sand, etc. therethrough. Such excessive abrasion frequently degrades metal pipe to a point where leakage of the contents of the pipe therefrom becomes a major concern. Additionally, such abrasion may, in some instances be sufficient to adversely affect the structural integrity of the pipe, and consequently result in structural failure of the pipe wherein the overburden crushes a portion of the pipe, thereby effectively plugging the pipe and substantially reducing or eliminating flow therethrough.

In recognition of these deficiencies, prior art attempts to allow the use of concrete pipe as opposed to vitreous clay pipe for large size sewer applications while reducing the susceptibility to corrosion of concrete pipe have included: the installation of a thick corrosive-resistant plastic liner, and/or forming the inside of a concrete pipe with an additional sacrificial concrete in the crown portion of the pipe.

Such prior art corrosion-resistant liners typically comprise plastic inserts sized to be received within each concrete pipe section. Such liners are commonly cast within each pipe section. Subsequently after the pipe sections have been laid in place, adjacent liners are bonded together with the intention of forming a seal to prevent corrosive fluids and gases from contacting the concrete pipe. Although such prior art concrete pipe/plastic liner solutions have proven generally suitable for large size sewer applications, the inherent high cost of such solutions has posed a severe impediment in construction products and projects. Further the useful life of such prior art sacrificial concrete pipe solutions is finite, which requires widespread rehabilitation over time thereby mandating tremendous expense in down line rehabilitation costs.

In recognition of the general inability of metal pipe and concrete pipe for sewer applications, in recent years plastic pipe has been introduced into the marketplace. Although such plastic pipe withstands degradation caused by the corrosive environment found in sewer applications, its use has heretofore been primarily limited to small size sewer applications. In this regard, the structural integrity of plastic pipe is extremely limited such that in large size applications, the sidewall of such plastic pipe must be fabricated extremely thick or profiled to enable such plastic pipe to withstand compressive forces exerted in burial applications. Due to the high cost of such plastic material, the use of such plastic pipe in large scale sewer applications has been economically impractical. Therefore, in view of the specific factors encountered in large scale sanitary sewer applications, nearly all such applications have utilized costly concrete pipe having a sacrificial wall formed therein which significantly decay over prolonged use and thus will require costly rehabilitation and/or replacement over time or separately affixed liners which are typically cost ineffective.

In contrast to the waste product and/or acid environment encountered in sanitary applications, metal pipe utilized for burial storm drain applications additionally encounters substantial problems associated with its operational environment. In relation to burial storm drain applications, long term exposure of the exterior of the metal pipe within the burial environment serves to corrode the exterior of the pipe while water and debris flowing through the interior of the metal pipe degrades the pipe through abrasion.

In an effort to prevent such corrosion effects, the interior of metal pipe has been lined with concrete in the hopes that a thicker lining would be more abrasion resistant and thereby resist deterioration and corrosion. However, there fails to exist any cost effective means for anchoring concrete to the interior wall of metal pipe.

An alternative prior art approach to solving the corrosion and abrasion deficiencies of metal pipe for storm drain applications has been to fabricate the metal pipe from plastic laminated steel film material. One such prior art product is known as Black Klad, a product of Inland Steel Company of Chicago, Ill. Prior to rolling the steel sheet into a pipe section, one surface, i.e. that surface which forms the inner pipe surface, is laminated with a polymer material. The thickness of such lamination is limited to approximately 0.010 inch and is intended to resist degradation caused by corrosion and some abrasion. However, due to the comparatively thin thickness layer of plastic laminant, the laminant tends to wear through due to abrasion from sand, rocks, etc. and thereby expose the metal surface below. Further, during the pipe formation process, the thin laminant oftentimes is damaged due to metal cold roll forming procedures.

Attempts to apply thicker laminations to such prior art products have heretofore resulted in greater blistering and separation of the polymer compound from the metal pipe. As such, the application of a protective polymer layer to metal pipe has heretofore been rendered ineffective.

Therefore, because the prior art interior lining of metal pipes have proven susceptible to abrasion and corrosion, and since abrasion resistant inert linings such as those constructed of concrete or an inert polymer material have failed to remain effectively anchored to the metal pipe walls, metal pipe has heretofore been unacceptable for use in sanitary applications such as sanitary sewers.

As such, there exists a substantial need in the art for a sufficiently thick polymer liner which may be securely applied to metal surfaces to maintain the integrity thereof when the metal pipe is placed in a corrosive environment and to remain thereon without blistering during the pipe formation process. Further, there exists a substantial need in the art for an improved metal pipe with an inert protective lining constructed of a polymer material such as polyethylene which would resist the attack of sulfuric acid as well as resist other forms of corrosion encountered in sewer applications.

SUMMARY OF THE INVENTION

The present invention specifically addresses and alleviates the above referenced deficiencies associated in the prior art. More particularly, the present invention comprises a metal pipe with an integrally formed polymer liner for use in corrosive and abrasive environments. In the preferred embodiment of the present invention, the polymer liner is comprised of 0.050 to 0.125 inch thick polyethylene, preferably a low density polyethylene (LDPE), linear low density polyethylene (LLDPE), or a blend of both which is securely bonded to the metal pipe during fabrication of the metal pipe. As used herein, the term "low density polyethylene/linear low density polyethylene blend" is defined to include a blend having from 0 to 100% low density polyethylene and from 0 to 100% linear low density polyethylene. Thus, this term includes low density polyethylene with no linear low density polyethylene added and also includes linear low density polyethylene with no low density polyethylene added. However, other polymers having corrosion resistant properties similar to polyethylene are likewise contemplated herein.

The liner is formed by first applying a comparatively thin monolayer or multilayer polymer/adhesive film to the metal pipe surface during a pre-treatment process in order to facilitate bonding of the subsequently extruded, comparatively thick, layer of low density polyethylene/linear low density polyethylene blend. When the thin film is formed as a multilayer film, the sublayers are preferably co-extruded. However, the sublayers of the thin film may alternatively be formed completely independent of one another, i.e., at different times. While the comparatively thin film is preferably applied via extrusion or co-extrusion, those skilled in the art will appreciate that the comparatively thin film may be applied via various different well known techniques, including cast and blown-film techniques. The thin film is preferably applied in a pre-treatment process to the sheet metal, preferably prior to roll forming corrugations or ribs in the sheet steel. The comparatively thick low density polyethylene/linear low density polyethylene layer blend is preferably applied after the corrugations or ribs are formed in the sheet metal, preferably subsequent to helically winding and forming the sheet steel into a pipe product.

The thin film is specifically formed to securely adhere to the surface of the sheet metal and provide a polymer constituent layer suitable for subsequent thermal/chemical bonding of the comparatively thick layer of polyethylene, preferably a low density polyethylene/linear low density polyethylene blend. As such, the thin film serves as a strong bonding agent or interface which adhesively bonds to the metal pipe and additionally forms a base material suitable to enable the subsequent application of the comparatively thick layer of polyethylene, preferably low density polyethylene/linear low density polyethylene blend thereto.

The present invention provides a smooth, hydraulically efficient interior surface which is resistent to the corrosive action of sulfuric acid and the like as is typically encountered in sanitary applications. It is also highly resistant to abrasion caused by the flow of water-born debris such as dirt and gravel as is encountered in culvert and storm drain applications.

The comparatively thin film applied in the pre-treatment process to facilitate bonding of the later applied comparatively thick layer of low density polyethylene/linear low density polyethylene blend comprises either a monolayer or multilayer film. The monolayer film defines a single layer and the multilayer film defines two sublayers.

The monolayer is preferably comprised of polyolefin/ maleic anhydride (MA), ethylene acrylic acid (EAA), ethylene methacrylic acid (EMAA), or a blend of these polymers, or another metal adhesive.

Those skilled in the art will appreciate that various other metal adhesives are likewise suitable for use as the monolayer film. optionally, the monolayer may be corona treated prior to applying the comparatively thick layer of low density polyethylene/linear low density polyethylene blend.

When a monolayer of polyolefin/maleic anhydride is utilized, the concentration of maleic anhydride is preferably maintained between approximately 0–10%, preferably less than 1%, by weight.

The monolayer adhesively bonds to the metal surface, thereby providing a securely attached substrate to which the later applied comparatively thick low density polyethylene/ linear low density polyethylene blend bonds, so as to provide secure and reliable attachment of the low density-polyethylene/linear low density polyethylene blend to the metal pipe.

When a multilayer thin film is utilized, the first sublayer, i.e., that sublayer next to the metal pipe wall, is preferably formed the same as the monolayer discussed above, i.e., polyolefin/maleic anhydride, ethylene acrylic acid, ethylene methacrylic acid, a blend of these polymers, or another metal adhesive.

The second sublayer of the multilayer thin film, i.e., that sublayer formed on top of the first sublayer, to which the later applied layer of low density polyethylene/linear low density polyethylene blend is bonded, preferably comprises a polymer adhesive/polyethylene blend, i.e., a carboxymodified polyethylene such as either ethylene acrylic acid, ethylene methacrylic acid, low density polyethylene with a 0–10% concentration, by weight, of maleic anhydride, linear low density polyethylene with a 0–10% concentration, by weight, of maleic anhydride, high density polyethylene with a 0–10% concentration, by weight, of maleic anhydride, or some combination of these materials. Again, those skilled in the art will appreciate that various other metal adhesives are likewise suitable.

Those skilled in the art will further appreciate that various additives such as antiblocks, antioxidants, pigments, ultraviolet stabilizers, etc., may be added to the second sublayer, as desired. Corona treatment may also be utilized to facilitate application of the first and second sublayers, as desired.

It has been found that the use of the 0–10% concentration of maleic anhydride, as discussed above, increases the adhesion of the polyethylene monolayer or the second layer of the multilayer film by a factor of approximately 5 as compared to such layers lacking maleic anhydride.

The process of forming the metal pipe of the present invention commences with the steps of pre-washing G-210 (2 oz.) galvanized coil strip in the gauge range of 0.048 inches thick thru 0.138 inches thick to initially remove any residual oil and dirt. The metal is subsequently processed in a high pressure hot alkaline spray bath to remove any residual dirt or oils and then rinsed with high pressure hot water sprayed upon both surfaces of the metal. An optional mechanical brushing device may be employed to further condition the surfaces or to remove any residual chromates or surface oxides. A secondary high pressure hot alkaline spray and hot, fresh water rinse is then repeated. The strip is then treated with a suitable etchant and then dried. An optional oxygen barrier primer may be applied to the strip or the strip may be prime coated with an adhesive and then heated to the appropriate temperature to cure the coating with the subsequent lamination of the monolayer or multilayer film. Subsequently, this laminated strip is then water quenched and cooled to the appropriate ambient temperature and then recoiled into coil form again. Subsequently, the laminated coil may then be formed by conventional techniques to include corrugations or ribs and formed into a pipe length via a conventional pipe mill.

Subsequently, the pre-treated and corrugated/profiled sheet metal strip is optionally heated and a comparatively thick, typically having a thickness of approximately 0.050 to 0.125 of an inch, molten layer of polyethylene preferably a low density polyethylene/linear low density polyethylene blend, for example, is extruded unto the interior of the pipe length. Due to the comparatively thick layer being applied at an elevated plasticized temperature, it securely thermally and chemically bonds to the monolayer or multilayer thin film previously applied to the sheet metal to provide a composite corrosion and abrasive resistant pipe.

In the preferred embodiment of the present invention, application of the comparatively thick, low density polyethylene/linear low density polyethylene blend occurs subsequent to forming the sheet metal into a pipe product.

After this, the pipe sections are cooled and cut into desired lengths using conventional techniques. In addition to being thermally/chemically bonded to the comparatively thin film layer, the comparatively thick, low density polyethylene/linear low density polyethylene blend may optionally be further secured to the sheet metal via extruding the same polyethylene material into the ribs or channels of the pipe to form anchors which attach to the low density polyethylene/liner low density polyethylene blend layer.

Preferably, the anchor is extruded directly into the channel. The comparatively thick, low density polyethylene/ linear low density polyethylene blend is then immediately applied thereover such that the anchor and the low density polyethylene/linear low density polyethylene lend layer firmly bond to one another. Such thermal/chemical bonding is facilitated by positioning both the anchor extruder die and the low density polyethylene/linear low density polyethylene blend layer extruder die in close proximity to one another and in close proximity to the formed pipe.

Thus, the anchor conforms precisely to the configuration of the channel, i.e., substantially fills the channel, and additionally thermally bonds thereto. Extrusion of the anchor into the channel preferably occurs after the pipe has been formed, i.e., after interlocking of the seams attaching adjacent wall sections to one another.

Extrusion of the anchor into the channels may occur as a single extrusion, or alternatively, may comprise a plurality of extrusions. For example, in a double extrusion process approximately one half of the anchor is first formed by extruding into the lower portion of the channel and the remainder of the anchor is subsequently formed by applying a second extrusion upon the previously extruded portion of the anchor. Those skilled in the art will recognize that various numbers of extrusions may be so utilized in such multiple extrusion processes, as desired. A plurality of channels may be filled simultaneously or each channel may be filled individually, as desired.

Alternatively, the anchor and the low density polyethylene/linear low density polyethylene blend layer may be commonly extruded from a single extruder such that the channel is filled so as to form the anchor and the low density polyethylene/linear low density polyethylene blend layer applied upon the inner surface of the pipe simultaneously. The extruder is thus configured such that a quantity of low density polyethylene/linear low density polyethylene blend is initially provided in those areas of the pipe where the channel is formed and a further layered quantity of low density polyethylene/linear low density polyethylene blend is provided on the inner surface of the pipe, and extending over the channels. Thus, the fabrication process is simplified by reducing the number of extruders required and by eliminating the requirement for bonding between the anchor and the low density polyethylene/linear low density polyethylene blend layer since the two are integrally extruded.

Although disclosed in relation to specific application to pipe forming applications, the present invention is additionally applicable to other metal forming applications wherein chemical resistance of the fabricated metal product is required.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 11 is a perspective view of an apparatus for applying both the integral liner to the inner surface of the metal pipe and forming the anchor within a channel thereof;

FIG. 12 is an enlarged perspective view of the extruder for applying the integral liner and the extruder for forming the anchor of FIG. 11;

FIG. 13 is an enlarged perspective view of the liner extruder and anchor extruder of FIGS. 11 and 12; and FIG. 14 is an enlarged cross sectional side view of a tapered channel having an anchor extruded directly therein and also having the integral liner formed upon the inner surface of the pipe.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be instructed or utilized. The description sets forth the functions and sequence of steps for constructing and utilizing the invention in connection with the illustrated embodiments. It is to be understood, however, that the same or equivalent functions and sequences may be accomplished by different embodiments that are also intended to be encompassed within the spirit and scope of the invention.

Although not by way of limitation, the process and apparatus of the present invention is well suited for use on helical spiral ribbed metal pipe such as that disclosed in U.S. Letters Pat. No. 4,838,317 issued to Andre et al. and assigned to the subject assignee W. E. Hall Co., the disclosure of which is expressly incorporated herein by reference. In this regard, the process and apparatus of the present invention shall be described in relation to the fabrication of such helical spiral ribbed metal pipe. However, those skilled in the art will recognize that the teachings of this invention are applicable to other metal pipe structures, as well as other metal products, such as sheet products, which are desired to withstand corrosive environments.

Figure 1:
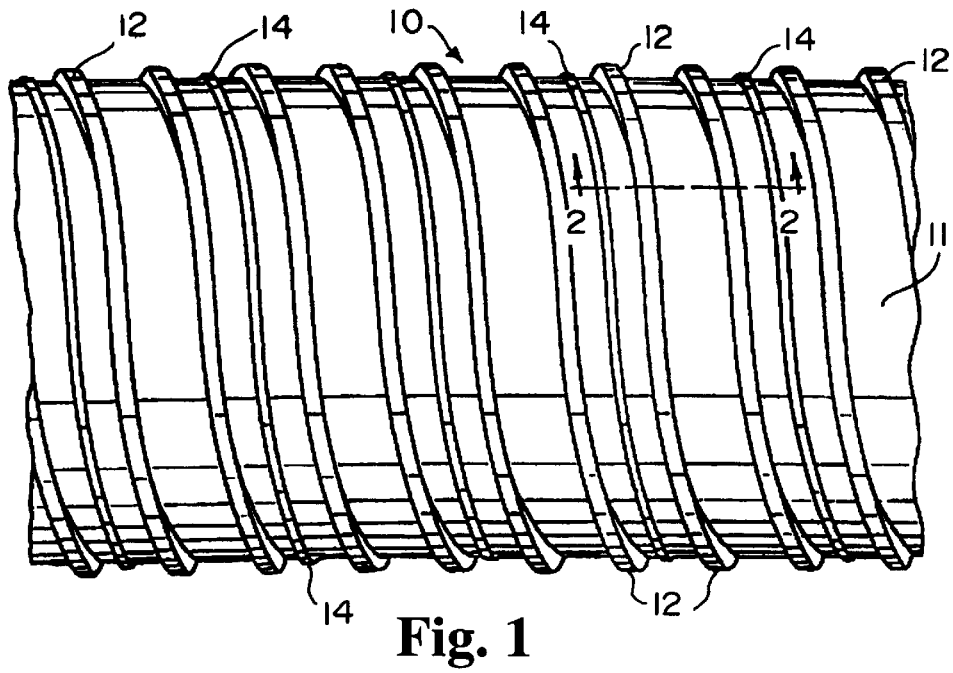
FIG. 1 is a perspective view of the exterior of a length of pipe constructed in accordance to the present invention.
Figure 2:
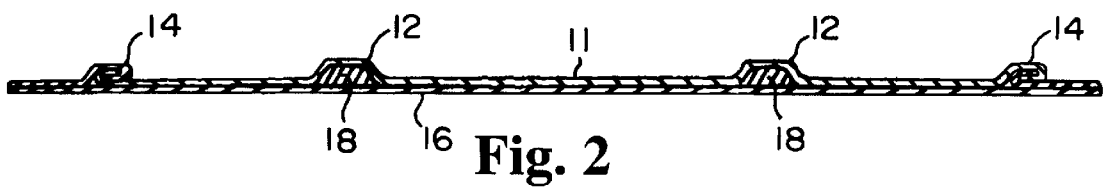
FIG. 2 is an enlarged cross-sectional view of the pipe wall of FIG. 1 taken about lines 2—2 of FIG. 1.

Referring now to FIGS. 1 and 2, the improved spiral ribbed pipe of the present invention is depicted as being generally comprised of a metal pipe wall material, preferably steel. Spiral ribbed pipe 10 has externally extending ribs 12 and lock seams 14 formed thereon, and also has an integrally formed polyethylene liner 16 formed upon the inner surface thereof. Spiral channels 18 are preferably formed in the sheet metal 11 of which the pipe 10 is formed, and are preferably filled with a polymer such as polyethylene, as will be explained in more detail infra.

Figure 3:
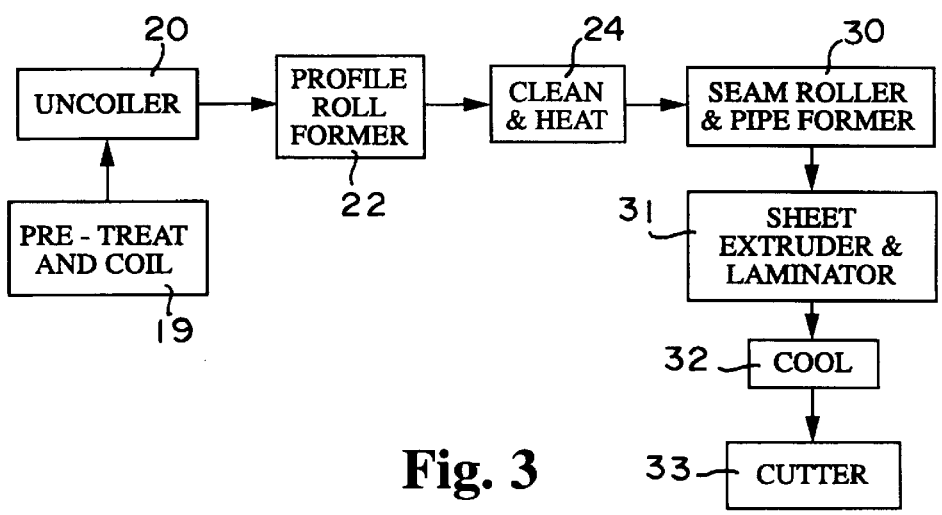
FIG. 3 is a flow diagram of the method of forming metal pipe with an integral liner of the present invention.
Figure 4:
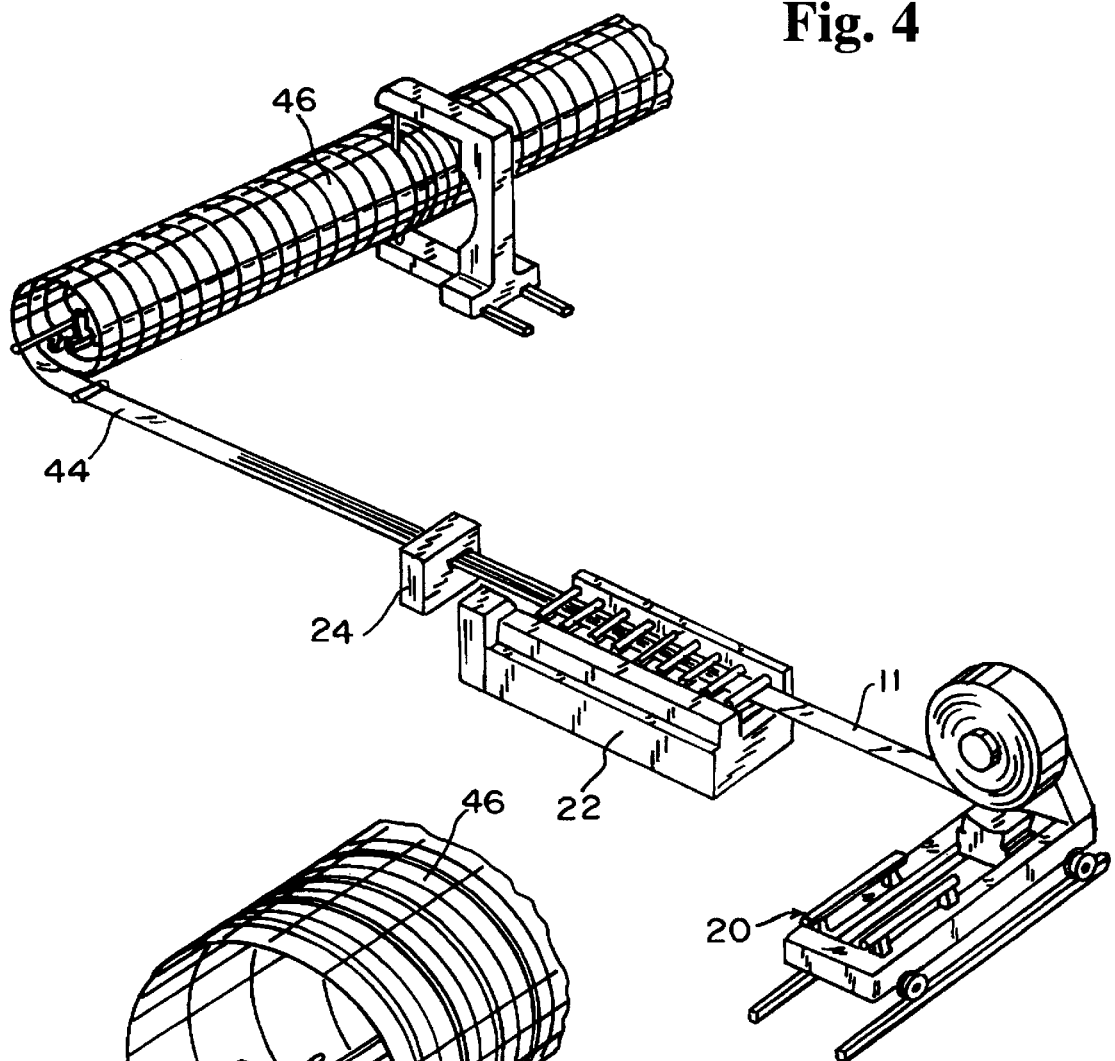
FIG. 4 is a perspective view of the apparatus for forming the metal pipe with an integrally formed liner for the present invention.
Figure 5:
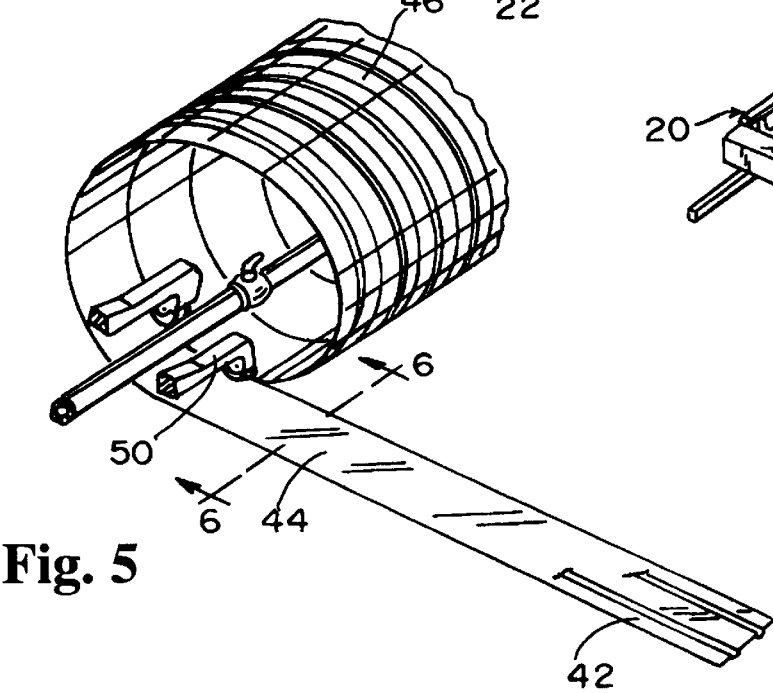
FIG. 5 is an enlarged perspective view of the pipe mill former of FIG. 4.

Referring now to FIG. 3, an overview of the process of forming the metal pipe 10 with an integrally formed liner 16 of the present invention is provided. The process generally comprises pre-treating sheet metal such as steel to have a comparatively thin, polymer/adhesive layer formed thereon and coiling the same for later pipe fabrication. The pre-treated sheet metal 11 is then subsequently uncoiled via an uncoiler 20, and ribs and/or corrugations and seams 14 (as shown in FIGS. 1 and 2) are formed thereon with a profile roll former 22 (as shown in FIG. 4). Subsequently, the pretreated and preformed sheet metal 11 may be cleaned and optionally heated 24. A seam roller and pipe former 30 forms the preformed sheet metal into a helical pipe section and crimps the lock seams 14 together to form a pipe product. A sheet extruder with a suitable die and laminator 31 provides hot extrudate polymer such as polyethylene and preferably low density and/or linear low density polyethylene or a blend thereof, to the upper or inside surface of the sheet metal. The laminator presses the hot extrudate into contact with the upper pre-treated surface of the sheet metal, thermally and chemically bonding the hot extrudate to the comparatively thin polymer/adhesive film layer. The pipe and liner are preferably cooled 32 after the extrusion process and cutter 33 then cuts sections of pipe to a desired length.

The steps of forming the ribs 12 and seams 14 with the profile roll former 22 and of forming the preformed sheet metal into a helical pipe section with pipe former 30 are thoroughly disclosed in U.S. Letters Pat. No. 4,838,317, issued to Andre et. al., the disclosure of which is expressly incorporated herein by reference. However, other conventional metal pipe fabrication techniques as well as other fabricated metal products are contemplated herein.

As best shown in FIGS. 1 and 2, the metal pipe having an integrally formed liner of the present invention includes a channeled wall defining a plurality of outwardly projecting structural ribs 12 and a hydraulically efficient interior surface. The ribs 12 are preferably formed in a helical configuration. The channels 18, which are formed interiorly thereof, are generally fabricated having either a square, rectangular or deltoid configuration, and are open along the interior surface of the pipe. In the preferred embodiment of the present invention, the channels 18 are tapered to define a deltoid shape so as to mechanically capture an anchor therein, as shown in FIG. 14.

Figure 9:
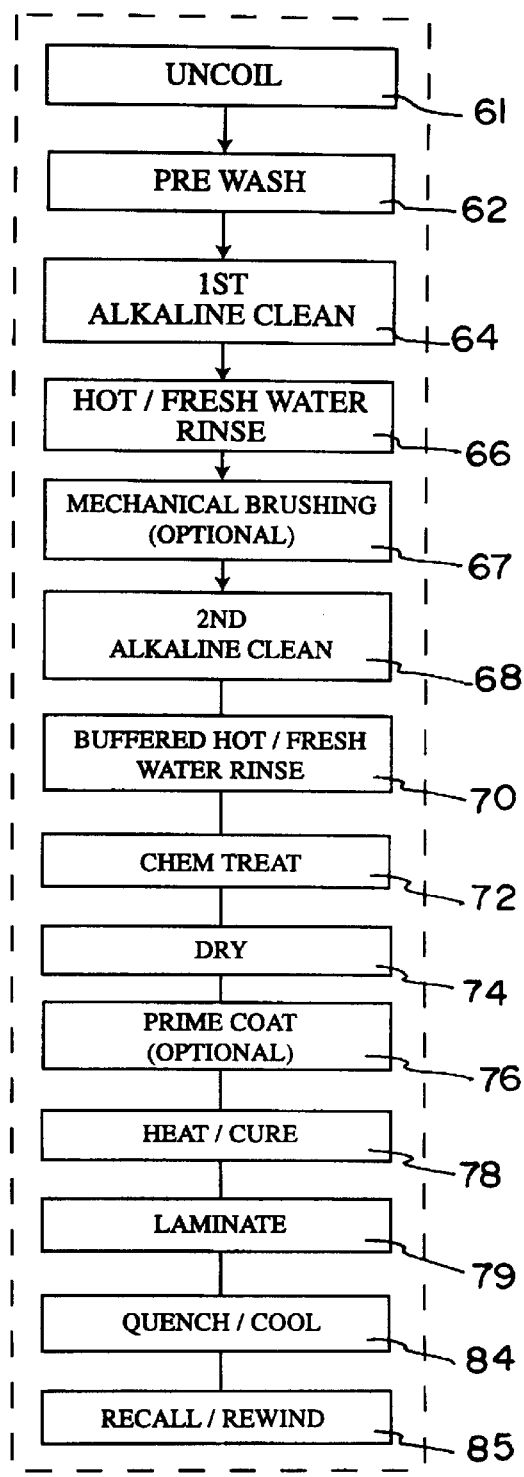
FIG. 9 is a flow chart of the pre-treatment, pre-coating process for bonding the thin mono/multi-film layer to the sheet metal.

Referring now to FIG. 9, the detailed steps of the pretreatment process 19 (of FIG. 3) utilized prior to forming the sheet metal 11 into sections of pipe 10 is described. Those skilled in the art will recognize that as conventional practice, the sheet metal 11 is fabricated in elongate lengths that are coiled for ease in subsequent forming processes.

The initial pre-treatment process 19 is initiated by un-coiling the coiled galvanized metal strip 61 and then pre-washing 62 the strip to remove any residual oil and/or dirt from the upper and lower surfaces of the strip of sheet metal 11. This step may consist of processes well known in the art such as the application of a detergent solution. The sheet metal 11 is then preferably subjected to a high pressure hot alkaline spray bath 64 to further loosen and remove any oil and dirt remaining upon the surfaces. The alkaline spray 64 is followed by a high pressure hot water/fresh water rinse 66. The strip 11 may optionally be brushed with a mechanical rotary brushing device 67 to remove any residual chromates and to further condition the surfaces of the metal or to remove any oxides. The strip of sheet metal 11 is then further conditioned and cleaned with another high pressure hot alkaline wash 68 to ensure adequate removal of any residual chromates or surface contaminants. Strip of sheet metal 11 is then rinsed with a buffered high pressure hot water/fresh water rinse to neutralize the surface and prepare same for the application of the etchant. Following the treatment of the pre-wash 62, alkaline cleaning 64, hot water/fresh water rinse 66, optional mechanical brushing 67, second alkaline cleaning 68, and buffered hot water/fresh water rinse 70, the sheet metal is subsequently subjected to a chemical treatment or etchant 72, such as Parker BONDERITE 1303, or Betz Metchem PERMATREAT 1500 etchant to roughen the surface and prepare it for the optional application of a primer or adhesive. Next the sheet metal is dried 74, and an optional oxygen barrier primer or adhesive 76, may be applied to the etched strip of sheet metal 11. In most instances however, the oxygen barrier primer or adhesive may be eliminated. Subsequently, the etched strip of sheet metal 11 is cured or heated 78, to an exit metal temperature of approximately 400° F. and a comparatively thin, continuous, planar, preferably co-extruded polymer/adhesive layer is laminated 79 to the sheet metal 11.

Figure 10:
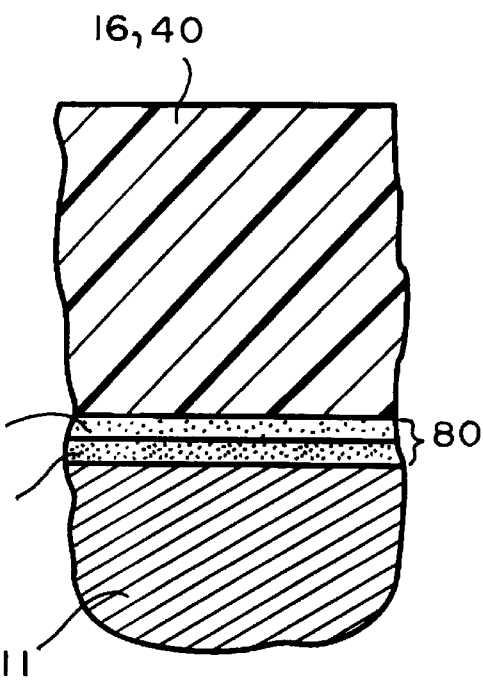
FIG. 10 is an enlarged cross-sectional view of a portion of the liner and steel pipe showing the resultant thin film layer and the comparatively thick low density polyethylene layer formed on the interior of the pipe layer.

As best shown in FIG. 10, the polymer/adhesive layer 80 is applied to the sheet metal to have a laminated thickness of 10 mils min. and is preferably manufactured as a monolayer or alternatively as a multilayer film having two distinct layers, i.e., the lower laminate layer 81 and upper laminate layer 82. As a monolayer film, the comparatively thin layer preferably comprises a polymer/adhesive material such as polyolefin/maleic anhydride, ethylene acrylic acid, ethylene methacrylic acid, or a blend of these. Those skilled in the art will appreciate that various other polymer metal adhesives are likewise suitable. Optionally, corona treatment may be utilized prior to application of the comparatively thin layer so as to enhance a fusion thereof.

As a multilayer film, the first sublayer thereof, i.e., that layer immediately adjacent the metal surface, is preferably formed as the same polymer/adhesive material as the monolayer discussed above and the second sublayer, is preferably formed upon the first layer, and comprises a carboxymodified polyethylene such as an ethylene acrylic acid, low density polyethylene blend having a 0–10% concentration, by weight, of maleic anhydride, linear low density polyethylene having a 0–10% concentration, by weight, of maleic anhydride, high density polyethylene having a 0–10% concentration, by weight, of maleic anhydride, or ethylene methacrylic acid. Those skilled in the art will appreciate that various other metal adhesives are likewise suitable.

Further, those skilled in the art will appreciate that various different additives such as antiblocks, antioxidants, pigments, and UV stabilizers may be utilized, as desired. Both the first and second layers are optionally treated to facilitate adhesion of subsequently applied layers.

The first and second sublayers of the comparatively thin film are fabricated by any of the various techniques well known in the art, including cast and blown film techniques.

Preferably, the first sublayer of the thin film comprises ethylene acrylic acid and the second layer of the thin film comprises linear low density polyethylene having a 0–10% concentration of maleic anhydride, by weight.

Thus, in the preferred embodiment, the lower laminant 81 is formed of an ethylene acrylic acid which comprises an adhesive which securely bonds the co-extruded laminant 80 to the sheet metal 11 via direct contact with the sheet metal 11 or contact with the prime coat 76 applied to the sheet metal 11. As will be explained in more detail infra, the monolayer or multilayer co-extruded film layer 80 therefore provides a lower adhesive/polymer layer 81 adapted to securely bond the co-extruded layer 80 to the sheet metal 11 and an upper polymer containing layer 82 which serves as a base material to allow thermal bonding of a subsequent polymer to the upper layer 82 of the co-extruded layer 80.

In the preferred embodiment, the preferably co-extruded polymer layer 80 is applied to the sheet metal 11 at an elevated temperature of approximately 425° to 630° F., and is pressed tightly thereupon by way of a conventional roller 316. Subsequently, the sheet metal 11 having the co-extruded polymer layer 80 applied thereto is cooled 84 and subsequently recoiled 85 for later use in the pipe fabrication process. In the preferred embodiment it is contemplated that the pre-treatment process is facilitated on both the upper and lower surfaces of the sheet metal 11 with the lower surface treatment providing additional corrosion protection for the soil side of the resultant pipe. However the lower side may alternatively be coated with conventional thermoplastic films such as vinyls or acrylics.

Figure 6:
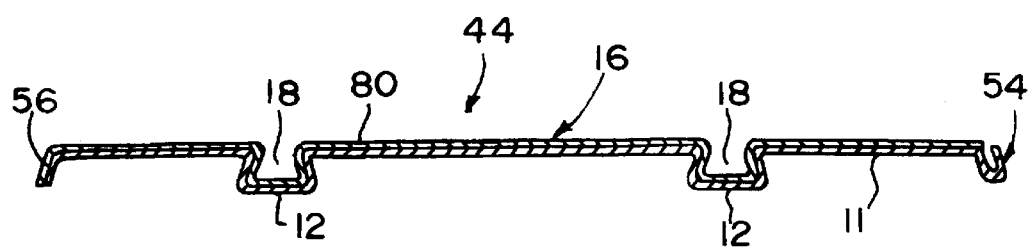
FIG. 6 is an enlarged sectional view of the sheet metal after the ribs and edge portions have been cold formed but prior to crimping.

Referring now to FIGS. 4 and 5 and 11 through 13, the additional process steps of actually forming the metal pipe 10 and applying the integrally formed liner 16 of the present invention are illustrated. As shown, the pre-treated sheet metal 11 previously disposed in a coil 30 is mounted upon a conventional uncoiler 20. The uncoiler 20 facilitates the uncoiling of the pre-treated sheet metal 11, having the polymer/adhesive layer 80 disposed upon the upper surface thereof. The pre-treated sheet metal 11 passes through a profile roll former 22 having a plurality of form rolls 32 which progressively form the ribs 12 (as shown in FIG. 1) and edge seam members 54 and 56 (as shown in FIG. 6) within the sheet metal 11. It should be noted that the formation of the ribs 12 comprises the major cold forming procedures for the pipe 10 and is facilitated on the pre-treated sheet metal. As such, the substantial tensile and compressive forces exerted in the cold forming process are accommodated by the comparatively thin, preferably co-extruded, polymer/adhesive layer 80 without cracking and/or blistering. Upon exiting the profile roll former 22, the sheet metal 11 may optionally be subjected to a cleaner/heater 24 which prepares the upper polymer/adhesive surface of the sheet metal 11 for the subsequent pipe length forming process and the thermal/chemical bonding of the comparatively thick polymer layer, preferably low density polyethylene thereto.

Figure 7:
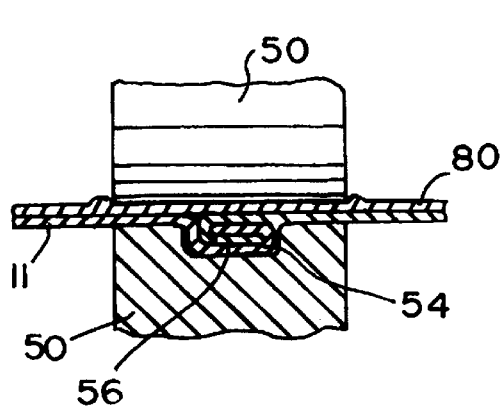
FIG. 7 is a sectional view depicting the crimping lock seam process.
Figure 8:
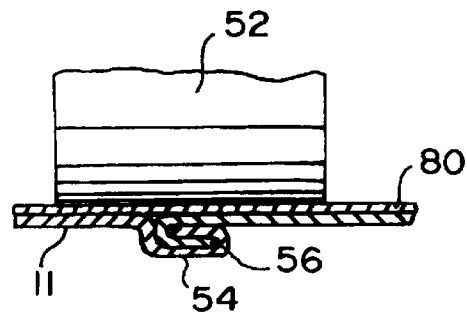
FIG. 8 is a sectional side view depicting the optional roller blending of the monolayer/co-extruded layer over the crimped lock seam.

The thermally bonded metal/polyethylene sheet 44 is then passed into a conventional pipe mill having a crimp/forming roller 50 which helically winds and crimps the male and female edge seams 56 and 54 into a lock seam which forms the resultant pipe length 46. The action of the crimping/forming roller 50 is depicted in FIG. 7. As shown in FIG. 7, the crimping/forming rollers 50 crimps adjacent edge seam members 56 of the polymer/adhesive laminated sheet metal 44 together by forcing male seam members 56 into the adjacent female seam member 54 as the sheet steel 44 is rolled helically and then bending both male 56 and female 54 seam members into laminar juxtaposition with the adjacent laminated steel sheet 11.

As the pipe mill progressively forms the length of pipe 46, the comparatively thick polymer layer preferably formed of a low density polyethylene is subsequently applied within the interior of the pipe length 46 by way of an extrusion process. In the preferred embodiment, the extrusion process is utilized to simultaneously fill the interior of the channel or rib 18 formed on the pipe wall while simultaneously applying the comparatively thick polymer layer over the interior of the pipe section. In this regard, by filling the channel 18 of the ribs 12, a mechanical anchor is provided which further secures the resultant polymer layer 16 to the interior of the pipe length 46.

Referring now to FIGS. 11–13, the preferred apparatus for applying the layer of comparatively thick low density polyethylene and filling the channel 18 of the rib 12 to yield the anchor structure is shown. With particular reference to FIGS. 11 through 13, the apparatus preferably comprises a hopper 300 containing a granular polymer preferably polyethylene 302. A lead screw assembly 304 extends from the bottom of the hopper 300 and into the interior of the pipe 46 axially downline of crimping roller 50 by way of an extension 303. As will be recognized, as the sheet metal 11, is crimped by the roller 50, the resultant pipe 46 extends axially away from the roller 50, i.e., from left to right as viewed in FIG. 11.

As in contemporary extrusion systems, a lead screw assembly 304 heats and plasticizes the granular polymer 302 as it travels via lead screw 308 throughout the length of the lead screw assembly 304. The lead screw assembly 304 transports the polymer 302 to an extrusion head assembly or die 310 located axially down line from the crimp roller 50 which both fills the channel 18 to form an anchor 200 (FIG. 14) of the pipe section 46 and applies a liner 16 to the inner surface thereof.

With particular reference to FIGS. 12 and 13 the extrusion assembly die 310 comprises an anchor extruder die 312 and a liner extruder die 314. The anchor extruder die 312 deposits a quantity of polymer material directly into the channel 18 such that the channel 18 is substantially filled with polymer material, thereby forming an anchor 200 directly therein. Due to the interior of the channel 18 having the comparatively thin polymer/adhesive layer 80 previously applied thereto, the quantity of polymer firmly bonds to the polymer constituent of the previously applied comparatively thin layer. The liner extruder die 314 subsequently lays down a sheet of polymer material over the anchor 200 as well as upon the interior of the pipe wall such that the heated polymer material of the anchor 200 and the hot polymer material of the liner 16 adhere to one another, as well as to the previously applied comparatively thin polymer/adhesive layer 80 upon the pipe wall.

Preferably, each newly added section of liner 16 slightly overlaps the previously applied layer thereof, so as to assure adequate bonding thereto as well as desired coverage of the interior of the pipe 46.

As can be best seen in FIGS. 12 and 13, a roller 316 is preferably utilized to firmly press the extruded sheet 16 of polymer material into contact with the inner polymer/adhesive surface layer 80 of the pipe 46, thereby assuring adequate contact pressure to bond the layer 16 to the polymer/adhesive layer of the pipe wall. It has been found that a roller 316 comprised of aluminum and cooled with air allows the liner 16 to be firmly pressed into place while inhibiting adhesion of the liner 16 to the roller 316 itself. The roller 316 is preferably adjustable in height so as to vary the thickness of the liner 16 applied to the interior of the pipe section 46, as well as the application pressure. Those skilled in the art will recognize that alternative roller configurations are contemplated herein.

Although numerous polyethylene materials are suitable for use as the liner 16, a preferred material candidate for the comparatively thick polymer layer is a low density/linear low density polyethylene material known as DOWLEX 3010 or DPT 1450 (trademarks of Dow Chemical Company, Midland, Mich.), which are known to exhibit superior abrasion resistance. Preferably in the application process, the cleaner/heater 24 elevates the temperature of the sheet metal 11 and the polymer/adhesive layer 80 disposed thereon to approximately 100–225° F. and not to exceed 300° F. such that the polyethylene layer 16 will more readily thermally bond thereto.

The extruder head or die 310 forms the polyethylene into a continuous planar layer 40 (shown in FIG. 10) having a thickness of approximately 0.050 to 0.125 of an inch, and preferably approximately 0.100 inch, which is applied to the upper surface of the comparatively thin polymer/adhesive layer 80 disposed upon the sheet steel 11.

In the preferred embodiment the polyethylene layer 40 is extruded onto the comparatively thin polymer layer 80 at a temperature between approximately 425°–630° F., preferably approximately 525° F. In the absence of preheating, the preferred process and temperature for extruding DOWLEX 3010 is approximately 500° F.

Due to the polyethylene layer 40 being applied to the upper surface of the pre-treated sheet metal 11 at an elevated plasticized temperature, a strong thermal/chemical bond is facilitated between the polyethylene layer 40 and the polymer constituent existing in the upper layer 82 of the polymer/adhesive layer 80 disposed upon the sheet metal 11. As such, a polymer to polymer bond is achieved which securely affixes the low density polyethylene layer 40 to the pre-treated and pre-formed sheet metal 11. The resulting laminated sheet metal 11 may then be further cooled with blown air or water prior to being formed into a helical pipe section 46.

After application of the low density polyethylene or linear low density polyethylene layer 40 to the pre-treated sheet metal 11, the resultant metal/polyethylene laminate possesses a cross-sectional configuration depicted in FIG. 14. As shown, the low density polyethylene layer 40 extends in a thermally/chemically bonded generally contiguous orientation over the upper surface of the sheet metal 11 and preferably overlaps at the rib or channel 18 to maintain a consistently smooth diameter through the pipe length.

As should be recognized, the resultant pipe section 46 having the channels 18 filled with the anchor has structural strength greater than conventional spiral ribbed metal pipe. Further, as shown in FIG. 10, the pipe 10 includes an integrally formed substantially pure low density polyethylene liner 16 having sufficient thickness (i.e. approximately 0.100 of an inch) which is capable of withstanding corrosion caused by contaminant acids encountered in sewer applications. Additionally, since the low density polyethylene liner 16 is applied integrally to the pipe during the fabrication process and thermally bonded to the polymer/adhesive layer 80 adhered to the sheet metal 11, delamination, blistering or cracking of the low density polyethylene layer 16 is eliminated. Further upon installation of the pipe 10 in sewer applications, adjacent pipe sections may be easily abutted and joined at their interfaces by utilizing high density polyethylene wraps which may be thermally welded/bonded to the low density polyethylene liner affixed to the interior of the pipe.

Referring now to FIG. 14, a cross section of the anchor 200 formed within a channel 18 and a liner 16 formed upon the interior of a pipe section 46 is provided. The anchor 200 bonds to the liner 16 at the interface 320 thereof. Additionally, the anchor 200 is both mechanically captured and chemically bonded to the previously applied comparatively thin polymer/adhesive layer 80 within the channel 18. The anchor 200 is bonded within the channel 18 since it is applied thereon while in the plastic state and thus bonds to the previously applied comparatively thin layer 80 disposed within the channel 18. The anchor 200 is mechanically captured within the channel 18 due to the deltoid or upwardly tapered construction thereof, which mechanically prevents the anchor from being pulled therefrom. Additionally, the liner 16 adhesively bonds to the previously applied comparatively thin layer 80 applied on the interior of the pipe 46 since it is likewise applied in a heated or molten state.

Further, the helical shape of the anchor 200 itself tends to prevent its being pulled from the channel 18, since such pulling from the channel would require that the helical anchor be twisted to facilitate its removal. Thus, the present invention provides both an adhesive/chemical bond of the liner to the metal pipe as well as a mechanical bond via the deltoid shape anchor. Thus, if for any reason the adhesive/chemical bond should fail over time, the mechanical bond positively insures maintenance of the liner within the interior of the pipe.

It will be understood that the exemplary steel pipe with integrally formed liner described herein and shown in the drawings represents only a presently preferred embodiment of the invention. Indeed, various modifications and additions may be made to such embodiment without departing from the spirit and scope of the invention. For example, various polymer materials having properties similar to polyethylene and ethylene acrylic acid may be used. In this regard, Applicant has additionally found that low density polyethylene or linear low density polyethylene is a preferred material candidate for the liner 16 and use of such material is clearly contemplated herein. Disclosure and scope of the present invention is not limited to the use of low density polyethylene. In this regard, in its broad sense, the present invention facilitates the use of a relatively thick polymer liner to be disposed upon a metal surface, which polymer is adhered to the metal surface by way of a previously applied comparatively thin layer having an adhesive component and a polymer/adhesive component which enables the subsequent thermal bonding of the comparatively thick substantially pure similar polymer layer via the constituent polymer layer found in the previously applied comparatively thin layer.

Additionally, the present invention contemplates the use of affixing a protective polymer layer to a fabricated product after pre-forming and/or completely forming the fabricated product by pre-treatment of the metal utilized in the fabricated product for subsequent deposition of the polymer layer thereto. Also, various metals and alloys having sufficient structural strength may be utilized as the pipe metal.

Furthermore, the polymer laminated metal and method for forming the same need not be limited to the fabrication of pipe, but rather may find application in many diverse areas such as automotive body sheet metal applications and the like. Thus, these and other modifications and additions may be obvious to those skilled in the art and may be implemented to adapt the present invention for use in a variety of different applications.

What is claimed is:

1. A laminated metal pipe comprising:
    a) a sheet metal pipe wall formed in a generally tubular configuration to define an inner surface thereof;
    b) a first polymer layer coated upon the inner surface of said pipe wall and adhesively bonded thereto;
    c) a second polymer layer coated upon said first polymer layer and chemically bonded thereto, said second polymer layer substantially thicker than said first polymer layer and chosen from the group consisting of a low density polyethylene, a linear low density polyethylene, and a blend thereof.

2. The laminated metal pipe as recited in claim 1 wherein the inner surface of the pipe wall has a rib extending radially outwardly therefrom to form a channel on said inner surface.

3. The laminated metal pipe as recited in claim 1 wherein said first polymer layer comprises a polymer/adhesive blend.

4. The laminated metal pipe as recited in claim 3 wherein said first polymer layer comprises first and second sublayers.

5. The laminated metal pipe as recited in claim 4 wherein said sheet metal pipe wall comprises a steel pipe wall.

6. The laminated metal pipe as recited in claim 5 wherein:
    a) said first polymer layer has a thickness of approximately 0.010 inch; and
    b) said second polymer layer has a thickness of approximately 0.100 inch.

7. The laminated metal pipe as recited in claim 6 wherein the first and second sublayers of said first layer are each approximately 0.005 inch thick.

8. A method for forming laminated metal pipe, said method comprising the steps of:
    a) forming sheet metal into a generally tubular configuration to define a pipe wall having an inner surface thereof, said pipe wall having a first polymer layer coated upon the inner surface thereof, such that said first polymer layer adhesively bonds thereto;
    b) coating a second polymer layer upon said first polymer layer, said second polymer layer chemically bonded thereto, said second polymer layer substantially thicker than said first polymer layer and chosen from the group consisting of a low density polyethylene, a linear low density polyethylene, and a blend thereof.

9. The method as recited in claim 8 wherein the step of coating a second polymer layer upon said first polymer layer comprises coating a polyethylene polymer layer.

10. The method as recited in claim 9 wherein the step of coating a first polymer layer comprises coating a first adhesive/polyethylene polymer layer.

11. The method as recited in claim 10 wherein the step of coating the first polymer layer comprises:
    a) coating a first adhesive sublayer; and
    b) coating a second adhesive/polyethylene sublayer.

12. The method as recited in claim 11 wherein:
    a) said first layer is coated having a thickness of approximately 0.010 inch; and
    b) said second layer is coated having a thickness of approximately 0.100 inch.

13. A laminated steel pipe comprising:
    a) a steel pipe having an interior surface;
    b) a first polymer/adhesive blend layer coated upon the interior surface of said steel pipe;
    c) a second polymer layer substantially thicker than said first polymer/adhesive blend layer and chosen from the group consisting of a low density polyethylene, a linear low density polyethylene, and a blend thereof coated upon said first polymer/adhesive layer, wherein said first polymer/adhesive layer forms an adhesive interface for secure attachment of said second polymer layer to said metal pipe.

14. The laminated metal pipe as recited in claim 13 wherein said first polymer/adhesive blend layer comprises a monolayer.

15. The laminated metal pipe as recited in claim 13 wherein said first polymer/adhesive blend layer comprises a two sublayers.

16. The laminated metal pipe as recited in claim 15 wherein said second polymer layer comprises a polyethylene layer.

* * * * *